United States Patent
Soni et al.

(10) Patent No.: US 10,362,103 B2
(45) Date of Patent: Jul. 23, 2019

(54) SYSTEM AND METHOD FOR EVALUATING THE FEASIBILITY OF INTRODUCING A NEW NODE IN A BLOCKCHAIN INFRASTRUCTURE

(71) Applicant: ZENSAR TECHNOLOGIES LIMITED, Pune (IN)

(72) Inventors: Ramesh Chandra Soni, Pune (IN); Sandeep Gupta, Pune (IN); Mohan Hastak, Mumbai (IN)

(73) Assignee: Zensar Technologies Ltd., Pune (IN)

( * ) Notice: Subject to any disclaimer, the term of this patent is extended or adjusted under 35 U.S.C. 154(b) by 39 days.

(21) Appl. No.: 15/827,267

(22) Filed: Nov. 30, 2017

(65) Prior Publication Data

US 2018/0219945 A1 Aug. 2, 2018

(30) Foreign Application Priority Data

Jan. 27, 2017 (IN) .............................. 201721003038

(51) Int. Cl.
| | |
|---|---|
| H04L 9/06 | (2006.01) |
| H04L 9/32 | (2006.01) |
| G06N 20/00 | (2019.01) |
| H04L 29/08 | (2006.01) |
| H04L 12/751 | (2013.01) |
| G06F 16/903 | (2019.01) |

(52) U.S. Cl.
CPC .... *H04L 67/1046* (2013.01); *G06F 16/90335* (2019.01); *G06N 20/00* (2019.01); *H04L 9/0637* (2013.01); *H04L 9/3236* (2013.01); *H04L 45/02* (2013.01); *H04L 67/1097* (2013.01); *H04L 9/3297* (2013.01); *H04L 2209/38* (2013.01)

(58) Field of Classification Search
CPC ............. H04L 2209/56; H04L 2209/38; H04L 9/3236; H04L 45/02; H04L 67/1046
See application file for complete search history.

(56) References Cited

U.S. PATENT DOCUMENTS

| | | | |
|---|---|---|---|
| 2016/0292672 A1* | 10/2016 | Fay | G06Q 20/363 |
| 2018/0109516 A1* | 4/2018 | Song | H04L 9/3263 |
| 2018/0158034 A1* | 6/2018 | Hunt | G06Q 20/027 |
| 2019/0058590 A1* | 2/2019 | Watanabe | G06Q 20/0658 |

* cited by examiner

*Primary Examiner* — Michael A Keller
*Assistant Examiner* — Austin J Moreau
(74) *Attorney, Agent, or Firm* — Blueshift IP, LLC; Robert Plotkin

(57) ABSTRACT

The present disclosure envisages a system for evaluating the feasibility of introducing a new node in a blockchain infrastructure. The blockchain dimension queries and the transaction dimension queries are presented to a user. The user provides responses to the blockchain dimension queries and transaction dimension queries. A feature detector module detects features from the blockchain dimension responses and the transaction dimension responses. A feature value assignor assigns feature values to the detected features. A criticality assignor assigns criticality scores to the detected features. A weightage assignor assigns weightage scores to the blockchain dimension queries and the transaction dimension queries. The feasibility evaluator receives the feature values, the criticality scores, and the weightage scores, and calculates a feasibility score, thereby evaluating the feasibility of introducing the new node.

8 Claims, 3 Drawing Sheets

US 10,362,103 B2

Figure 1:
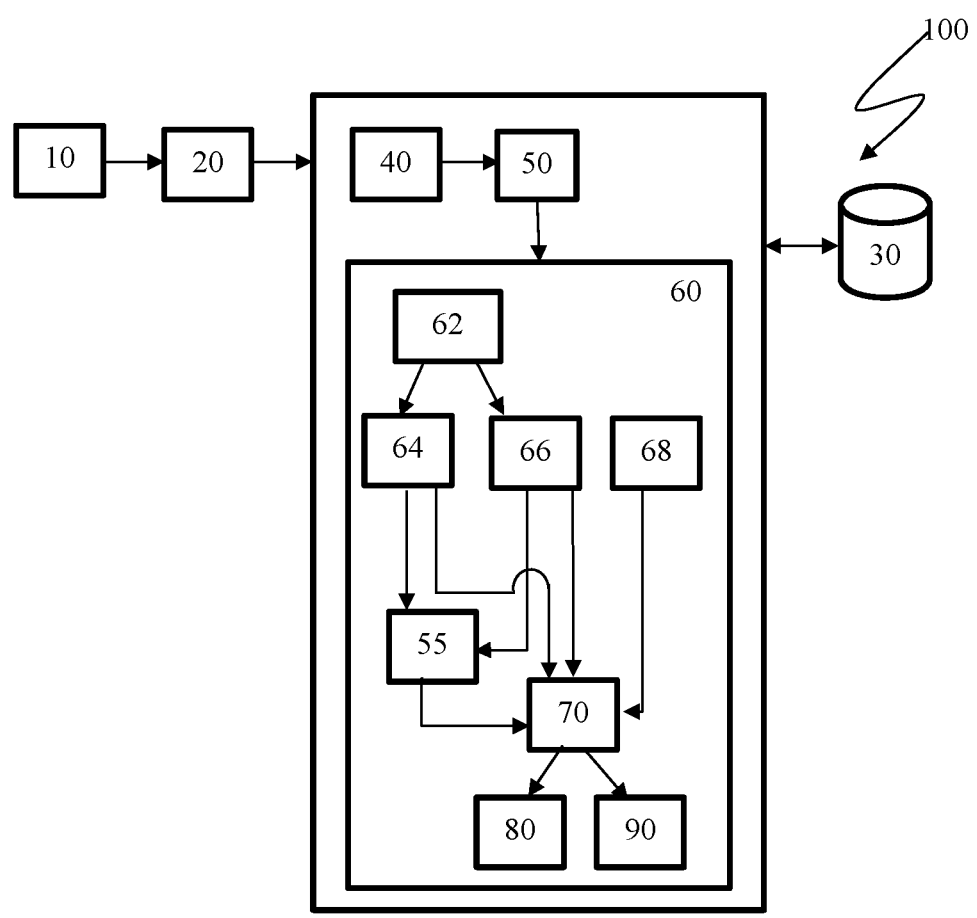

SYSTEM AND METHOD FOR EVALUATING THE FEASIBILITY OF INTRODUCING A NEW NODE IN A BLOCKCHAIN INFRASTRUCTURE

FIELD

The present disclosure relates to the field of systems using or intending to use a blockchain infrastructure.

Definitions

As used in the present disclosure, the following terms are generally intended to have the meaning as set forth below, except to the extent that the context in which they are used indicate otherwise.

The expression "blockchain infrastructure" used hereinafter in this specification refers to a distributed infrastructure that is used to maintain a continuously growing list of data records called blocks, which can be shared between multiple parties. Each block contains a timestamp and a link to a previous block and can specific access rights.

These definitions are in addition to those expressed in the art.

BACKGROUND

Typically systems/networks using blockchain architecture (blockchain networks) have a plurality of nodes. These nodes are interconnected with each other such that every node is an "administrator" of the blockchain who can access as well as modify data. As the blockchain network is self-auditing (i.e. it automatically checks and updates itself periodically), there is transparency of data between the nodes. Further, the chances of data corruption are negligible, as the data is not stored at a single location. Additionally, if any unit of information is required to be altered, it requires huge amount of computing power to override the entire network. Thus, the networks using blockchain infrastructure are robust in nature. However, it is difficult to identify if a node can form a blockchain network or can be a part of an existing blockchain network, as every type of node is not suitable to utilize a blockchain infrastructure. Presently, there are no systems to identify suitability and the feasibility of introducing a new entrant in a blockchain infrastructure.

Therefore, there is a need to limit this and provide a system that identifies the suitability and feasibility of introducing a new entrant node in a blockchain network.

OBJECTS

Some of the objects of the present disclosure, which at least one embodiment herein satisfies, are as follows:

It is an object of the present disclosure to ameliorate one or more problems of the prior art or to at least provide a useful alternative.

Another object of the present disclosure is to provide a computer implemented system and method for evaluating the feasibility of introducing a new node in a blockchain infrastructure.

Yet another object of the present disclosure is to provide a computer implemented system for evaluating the feasibility of introducing a new node in a blockchain infrastructure, which provides a feasibility score.

Still another object of the present disclosure is to provide a computer implemented system for evaluating the feasibility of introducing a new node in a blockchain infrastructure, which has a self-learning capability to improve accuracy of the feasibility score.

Other objects and advantages of the present disclosure will be more apparent from the following description, which is not intended to limit the scope of the present disclosure.

SUMMARY

The present disclosure envisages a system for evaluating the feasibility of introducing a new node in a blockchain infrastructure, the system comprising: a memory, a processor, a database, a query presentation module, an input module, and an assessment module. The memory is configured to store a set of predetermined rules including feature detection rules, feature value assignment rules, weightage assignment rules, and criticality score assignment rules. The processor is adapted to cooperate with the memory to receive the set of predetermined rules and is further configured to generate system processing commands. The database is configured to store a plurality of blockchain dimension queries, and a plurality of transaction dimension queries. The query presentation module is configured to present the blockchain dimension queries, and the transaction dimension queries to a user. The input module is configured to receive a plurality of blockchain dimension responses and a plurality of transaction dimension responses corresponding to the blockchain dimension queries and the transaction dimension queries, related to the introducing new node, from the user. The assessment module is adapted to cooperate with the input module and the database to receive the blockchain dimension queries, the transaction dimension queries, and the respective blockchain dimension responses, and transaction dimension responses. The assessment module comprises: a feature detector, a feature value assignor, a criticality assignor, a weightage assignor, and a feasibility evaluator. The feature detector is configured to detect features from each of the blockchain dimension responses and the transaction dimension responses based on the feature detection rules. The feature value assignor is configured to assign a feature value to each of the detected features based on the feature value assignment rules. The criticality assignor is configured to assign a criticality score to each of the detected features based on the criticality score assignment rules. The weightage assignor is configured to assign a weightage score to each of the blockchain dimension queries and the transaction dimension queries, based on the weightage assignment rules. The feasibility evaluator is configured to receive the feature values, criticality scores, and weightage score, and is further configured to calculate a feasibility score, thereby evaluating the feasibility of the introducing new node.

In an embodiment, the system includes a display for displaying the feasibility score of the new node.

In an embodiment, the system includes a feedback module to receive the feasibility score and use it as a feedback.

In an embodiment, each of the blockchain dimension queries and each of the transaction dimension queries include blockchain dimension sub queries and transaction dimension sub queries respectively.

In an embodiment, the assessment module includes a response combiner for combining feature values assigned to responses received for the blockchain dimension sub queries and transaction dimension sub queries respectively.

The present disclosure also envisages a method for evaluating the feasibility of introducing a new node in a blockchain infrastructure, the method comprising the following steps:
- storing, in a memory, a set of predetermined rules including feature detection rules, feature value assignment rules, weightage assignment rules, and criticality score assignment rules;
- receiving the set of predetermined rules and generating system processing commands, by a processor;
- storing, in a database, a plurality of blockchain dimension queries, and a plurality of transaction dimension queries;
- presenting, by a query presentation module, the blockchain dimension queries, and the transaction dimension queries to a user;
- receiving from the user, by an input module, a plurality of blockchain dimension responses and a plurality of transaction dimension responses with respect to the blockchain dimension queries and the transaction dimension queries, related to the new node;
- receiving, by an assessment module, the blockchain dimension queries, the transaction dimension queries, and the respective blockchain dimension responses, and transaction dimension responses;
- detecting, by a feature detector, a features from each of the blockchain dimension responses and the transaction dimension responses based on the feature detection rules;
- assigning, by a feature value assignor, a feature value to each of the detected features based on the feature value assignment rules;
- assigning, by a criticality assignor, a criticality score to each of the detect features based on the criticality score assignment rules;
- assigning, by a weightage assignor, a weightage score to each of the blockchain dimension queries and the transaction dimension queries, based on the weightage assignment rules; and
- receiving, by a feasibility evaluator, the feature values, criticality scores, and weightage scores, and calculating a feasibility score, thereby evaluating feasibility of the new node.

In an embodiment, each of the blockchain dimension queries and each of the transaction dimension queries include respective blockchain dimension sub queries and transaction dimension sub queries. In another embodiment, the assessment module includes a response combiner to combine the responses of the blockchain dimension sub queries and the transaction dimension sub queries, respectively.

BRIEF DESCRIPTION OF THE ACCOMPANYING DRAWINGS

Figure 2A:
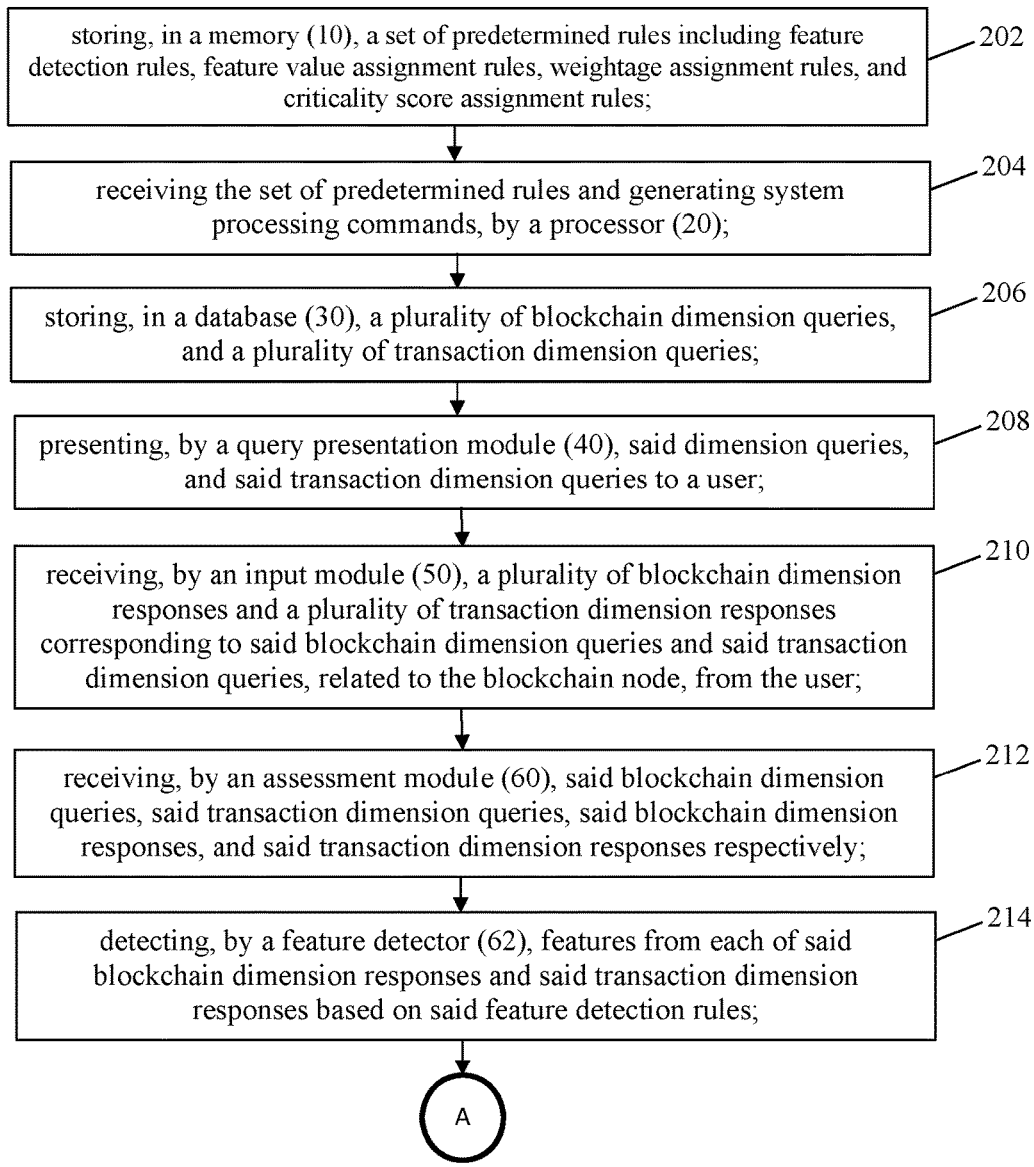
Figure 2B:
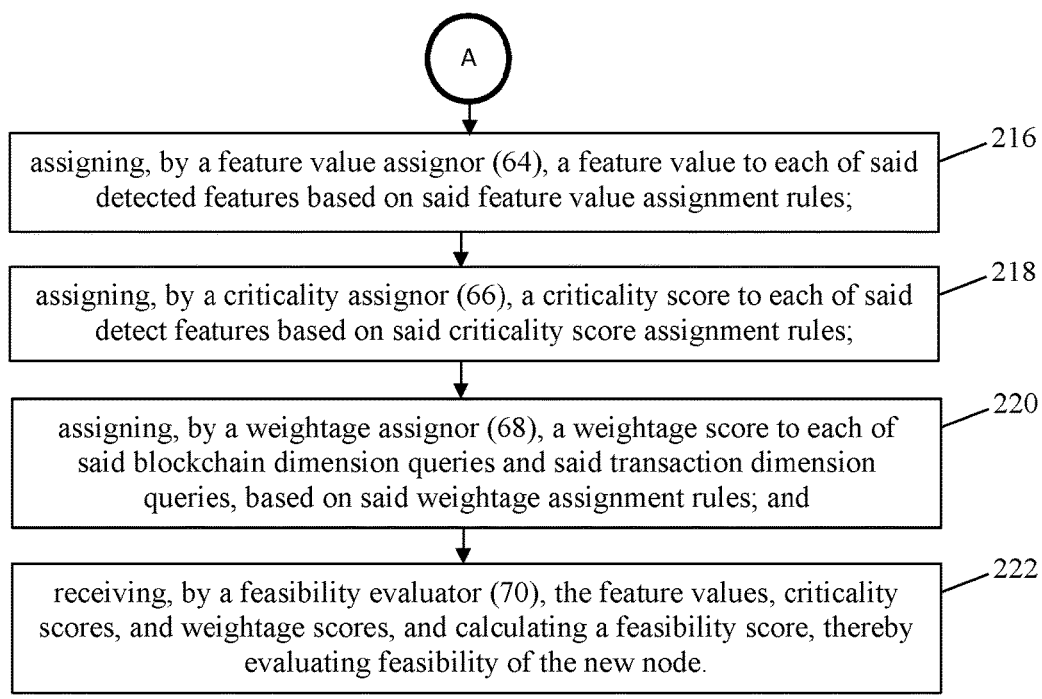

The system and method for evaluating the feasibility of introducing a new node in a blockchain infrastructure, of the present disclosure will now be described with the help of the accompanying drawing, in which:

FIG. 1 illustrates a schematic block diagram of a computer implemented system for evaluating the feasibility of introducing a new node in a blockchain infrastructure, in accordance with an embodiment of the present disclosure; and FIGS. 2A and 2B illustrate a flow diagram showing steps performed by the system for evaluating the feasibility of introducing a new node in a blockchain infrastructure of FIG. 1, in accordance with an embodiment of the present disclosure.

LIST OF REFERENCE NUMERALS

| Reference Numeral | Reference |
| --- | --- |
| 10 | memory |
| 20 | Processor |
| 30 | database |
| 40 | query presentation module |
| 50 | input module |
| 55 | response combiner |
| 60 | assessment module |
| 62 | feature detector |
| 64 | feature value assignor |
| 66 | criticality assignor |
| 68 | weightage assignor |
| 70 | feasibility evaluator |
| 80 | display |
| 90 | feedback module |
| 100 | system |

DETAILED DESCRIPTION

Typically systems/networks using blockchain architecture/infrastructure (blockchain networks) have a plurality of nodes. These nodes are interconnected with each other such that every node is an "administrator" of the blockchain who can access as well as modify data. As the blockchain network is self-auditing (i.e. it automatically checks and updates itself periodically), there is transparency of data between the nodes. Further, the chances of data corruption are negligible, as the data is not stored at a single location. Additionally, if any unit of information is required to be altered, it requires huge amount of computing power to override the entire network. Thus, the networks using blockchain infrastructure are robust in nature. However, it is difficult to identify if a node can form a blockchain network or can be a part of an existing blockchain network, as every type of node is not suitable to utilize a blockchain infrastructure. Presently, there are no systems to identify suitability and the feasibility of a new entrant in a blockchain infrastructure. Therefore, there is a need to limit this and provide a system that identifies suitability and feasibility of a new entrant node in a blockchain network.

The present disclosure envisages a system that evaluates feasibility of a new entrant node in a blockchain network. The blockchain network, in one embodiment, is an existing blockchain network. In another embodiment, the blockchain network is created based on the feasibility evaluation of the node. The system of the present disclosure is now described with the help of accompanying non-limiting drawing in which FIG. 1 illustrates a schematic block diagram of a computer implemented system (100) for evaluating the feasibility of introducing a new node in a blockchain infrastructure (hereinafter referred to as system), in accordance with one embodiment.

In an embodiment, the system (100) is used to determine the feasibility of including a new node in a network of nodes which use a blockchain infrastructure. For the new node to be included in the blockchain network, features related to the new node need to be analyzed.

For this, the system (100) includes a memory (10), a processor (20), a database (30), a query presentation module (40), an input module (50), and an assessment module (60).

The memory (10) is configured to store a set of predetermined rules including feature detection rules, feature value assignment rules, weightage assignment rules, and criticality score assignment rules. The memory (10) may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes. In an embodiment, the feature detection rules, the feature value assignment rules, the weightage assignment rules, and the criticality score assignment rules are generated by a rule generator (not shown in figure) based on historical data.

The processor (20) is configured to cooperate with the memory (10) to receive the set of predetermined rules and is further configured to generate system processing commands. The processor (20) may be implemented as one or more microprocessors, microcomputers, microcontrollers, digital signal processors, central processing units, state machines, logic circuitries, and/or any devices that manipulate signals based on operational instructions. Among other capabilities, the processor (20) is configured to fetch and execute the set of predetermined rules stored in the memory (10) to control modules of the system (100).

The database (30) is configured to store a plurality of blockchain dimension queries and a plurality of transaction dimension queries. The plurality of blockchain dimension queries may include queries related to taxonomy (for example, which industry or branch does the node relate to), volume of nodes that need to be added to the network, internal and external compliance questions, hierarchy of a new node with respect to the existing nodes, and the like. The plurality of transaction dimension queries may include queries related to time criticality related to the new node entry, process architecture of the new node, extent of impact due to the new node, reconciliation, and the like. In an embodiment, each of the blockchain dimension queries and each of the transaction dimension queries include blockchain dimension sub queries and transaction dimension sub queries respectively.

The query presentation module (40) is configured to present the blockchain dimension queries and the transaction dimension queries to a user.

The input module (50) is configured to receive a plurality of blockchain dimension responses and a plurality of transaction dimension responses, related to the new node, from the user, for the respective blockchain dimension queries and transaction dimension queries. In an embodiment, the input module (50) also receives responses with respect to the blockchain dimension sub queries and the transaction dimension sub queries.

The assessment module (60) is adapted to cooperate with the input module (50) and the database (30) to receive the blockchain dimension queries, the transaction dimension queries, and the respective blockchain dimension responses, and transaction dimension responses. The assessment module (60) comprises: a feature detector (62), a feature value assignor (64), a criticality assignor (66), a weightage assignor (68), and a feasibility evaluator (70).

The feature detector (62) is configured to detect features of the new node from each of the blockchain dimension responses and the transaction dimension responses based on the feature detection rules.

The feature value assignor (64) is configured to assign a feature value to each of the detected features based on the feature value assignment rules.

The criticality assignor (66) is configured to assign a criticality score to each of the detected features based on the criticality score assignment rules.

In an embodiment, the assessment module (60) includes a response combiner (55). The response combiner (55) is configured to combine feature values assigned to the response received for the blockchain dimension sub queries and the transaction dimension sub queries. For example, output of the response combiner (55) for sub-responses to one blockchain query is as below:

$$F_1 C_1 + F_2 C_2 + \ldots + F_n C_n$$

where, $F_1$ is feature value of response to $1^{st}$ blockchain dimension sub queries, $C_1$ is criticality score of $F_1$, $F_2$ is feature value of response to $2^{nd}$ blockchain dimension sub queries, $C_2$ is criticality score of $F_2$, and n is number of sub-responses. The output of the response combiner (55) is provided to the feasibility evaluator (70).

The weightage assignor (68) is configured to assign a weightage score to each of the blockchain dimension queries and the transaction dimension queries, based on the weightage assignment rules.

The feasibility evaluator (70) is configured to receive the feature values, criticality scores, and weightage scores, and is further configured to calculate a feasibility score, thereby evaluating feasibility of introducing the new node in the blockchain infrastructure. In one embodiment, the feasibility score is calculated as follows:

$$F = (F_{11}C_{11} + F_{12}C_{12} + \ldots + F_{1n}C_{1n}) * W_1/(100*n) + \\ (F_{21}C_{21} + F_{22}C_{22} + \ldots + F_{2n}C_{2n}) * W_2/(100*n) + \ldots \\ + (F_{m1}C_{m1} + F_{m2}C_{m2} + \ldots + F_{mn}C_{mn}) * W_m/(100*n)$$

where, F—Feasibility Score,
$F_{11}$—Feature value to response to $1^{st}$ sub-query of $1^{st}$ query,
$F_{12}$—Feature value to response to $2^{nd}$ sub-query of $1^{st}$ query,
$C_{11}$—Criticality score of response to 1st sub-query of $1^{st}$ query,
$C_{11}$—Criticality score of response to $2^{nd}$ sub-query of $1^{st}$ query,
$W_1$—Weightage for $1^{st}$ query,
$W_2$—Weightage for $2^{nd}$ query,
Weightage of $n^{th}$ query,
m—number of query, and
n—number of sub-queries for a query. This number can be different for different queries.

The feasibility score evaluated by the feasibility evaluator (70) can be displayed on a display (80). The evaluations done by the feasibility evaluator (70) are provided to a feedback module (90) to be used as feedback. This feedback is useful in modifying the weightages for queries, which in turn facilitates accurate feasibility evaluation. In one embodiment the feedback module (90) uses machine learning techniques such as multiple linear regression (MLR), a multivariate statistical technique for examining linear correlations between two or more independent variables (IVs) and a single dependent variable (DV), and the like. Multiple linear regression is obtained by implementing the following equation:

$$Y = \alpha + \beta_1 x_1 + \beta_2 x_2 + \beta_3 x_3 + \ldots + \beta_n x_n + \xi$$

where, Y—The dependent variable,
α—intercept term,

β—estimated β,
x—values for each of the i features,
ξ—Epsilon error (represents the residual)

This equation is used with the equation of feasibility score to obtain a feasibility score with Machine Learning Linear Regression, as below:

$$F = \alpha + \{\beta_1 * (F_{11}C_{11} + F_{12}C_{12} + \ldots + F_{1n}C_{1n}) * W_1/(100*n) +$$
$$\beta_2 * (F_{21}C_{21} + F_{22}C_{22} + \ldots + F_{2n}C_{2n}) * W_2/(100*n) + \ldots +$$
$$\beta_m * (F_{m1}C_{m1}F_{m2}C_{m2} + \ldots + F_{mn}C_{mn}) * W_m/(100*n)\} + \xi$$

where, F—Feasibility Score,
α—intercept term,
β—regression coefficients for the explanatory variables,
$F_{11}$—Feature value to response to $1^{st}$ sub-query of $1^{st}$ query,
$F_{12}$—Feature value to response to $2^{nd}$ sub-query of $1^{st}$ query,
$C_{11}$—Criticality score of response to $1^{st}$ sub-query of $1^{st}$ query,
$C_{12}$—Criticality score of response to $2^{nd}$ sub-query of $1^{st}$ query,
$W_1$—Weightage for $1^{st}$ query,
$W_2$—Weightage for $2^{nd}$ query,
m—number of queries (independent variables),
n—number of sub-queries for a query (occurrences),
$(R_{m1}M_{m1}+R_{m2}M_{m2}+ \ldots R_{mn}M_{mn})*W_m/(100*n)$—net output for each query, and
ξ—Epsilon error term In an embodiment, the system (100) uses the following:

Model=*lm*(Response Variable~Explanatory Variable 1+Explanatory Variable 2+Explanatory Variable 3 . . . )

where, lm—lm is a function used to perform multiple linear regression in R.

This provides value of slope and intercept i.e. α and β. With each execution of this model, the values of α and β change which in turn modify the weightages to give more accurate results. In an embodiment, the system (100) includes a prediction module (not shown in the figure) to predict financial viability of introducing the new node.

In another embodiment, pseudo code for evaluating the feasibility of introducing a new node in a blockchain infrastructure is as follows:

1. "N" number of networks using the blockchain infrastructure, each having a plurality of nodes "H"
2. Present the blockchain dimension queries and the transaction queries to the user wherein the blockchain dimension queries and the transaction queries includes sub-queries
3. Receive the blockchain dimension responses and the transaction responses from a user
4. Detect features from the blockchain dimension responses and the transaction responses and assign a feature value to each of the detected features such as: $F_1, F_2 \ldots F_n$
5. Assign criticality score to each of the detected feature: criticality_score=$F_1C_1, F_2C_2 \ldots F_nC_n$
6. Assign weightage to the blockchain dimension queries and transaction dimension queries (weightage_blockchain, weightage_transaction)
7. Calculate feasibility score of 'F'

FIG. 2 illustrates flow diagram, showing the steps performed by system of FIG. 1.

At block 202, storing a set of predetermined rules including feature detection rules, feature value assignment rules, weightage assignment rules, and criticality score assignment rules. In an embodiment, the memory (10), stores a set of predetermined rules including feature detection rules, feature value assignment rules, weightage assignment rules, and criticality score assignment rules.

At block 204, receiving the set of predetermined rules and generating system processing commands, by a processor (20). In an embodiment, the processor (20) receives the set of predetermined rules and generating system processing commands.

At block 206, storing a plurality of blockchain dimension queries, and a plurality of transaction dimension queries. In an embodiment, the database (30) stores a plurality of blockchain dimension queries, and a plurality of transaction dimension queries.

At block 208, presenting the blockchain dimension queries, and the transaction dimension queries to a user. In an embodiment, the query presentation module (40) presents the blockchain dimension queries, and the transaction dimension queries to a user. In another embodiment, each of the blockchain dimension queries and each of the transaction dimension queries include respective blockchain dimension sub queries and transaction dimension sub queries.

At block 210, receiving, by an input module (50), a plurality of blockchain dimension responses and a plurality of transaction dimension responses corresponding to the blockchain dimension queries and the transaction dimension queries, related to the new node, from the user. In another embodiment, the input module (50) also receives responses with respect to the blockchain dimension sub queries and the transaction dimension sub queries.

At block 212, receiving the blockchain dimension queries, the transaction dimension queries, and the blockchain dimension responses, and the transaction dimension responses respectively. In an embodiment, the assessment module (60) receives the blockchain dimension queries, the transaction dimension queries, and the blockchain dimension responses, and the transaction dimension responses respectively. In an embodiment, the assessment module (60) includes a response combiner (55) to combine the responses of the blockchain dimension sub queries and the transaction dimension sub queries, respectively.

At block 214, detecting features from each of the blockchain dimension responses and the transaction dimension responses based on the feature detection rules. In an embodiment, the feature detector (62) detects features from each of the blockchain dimension responses and the transaction dimension responses based on the feature detection rules.

At block 216, assigning a feature value to each of the detected features based on the feature value assignment rules. In an embodiment, the feature value assignor (64) assigns a feature value to each of the detected features based on the feature value assignment rules.

At block 218, assigning a criticality score to each of the detect features based on the criticality score assignment rules. In an embodiment, the criticality assignor (66) assigns a criticality score to each of the detect features based on the criticality score assignment rules.

At block 220, assigning a weightage score to each of the blockchain dimension queries and the transaction dimension queries, based on the weightage assignment rules. In an embodiment, the weightage assignor (68) assigns a weightage score to each of the blockchain dimension queries and the transaction dimension queries, based on the weightage assignment rules.

At block 222, receiving the feature values, criticality scores, and weightage score, and calculating a feasibility score, thereby evaluating feasibility of the new node. In an embodiment, by a feasibility evaluator (70) receives the feature values, criticality scores, and weightage score, and calculating a feasibility score, thereby evaluating feasibility of the new node.

TECHNICAL ADVANCEMENTS

The present disclosure described herein above has several technical advantages including, but not limited to, the realization of a computer implemented system and method for evaluating the feasibility of introducing a new node in a blockchain infrastructure, which:

provides a feasibility score; and has a self-learning capability to improve accuracy of the feasibility score.

The embodiments hereinabove and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system (100) for evaluating the feasibility of introducing a new node in a blockchain infrastructure, said system (100) comprising:

a memory (10) configured to store a set of predetermined rules including feature detection rules, feature value assignment rules, weightage assignment rules, and criticality score assignment rules;

a processor (20) adapted to cooperate with the memory (10) to receive the set of predetermined rules and further configured to generate system processing commands;

a database (30) configured to store a plurality of blockchain dimension queries, and a plurality of transaction dimension queries;

a query presentation module (40) configured to present said blockchain dimension queries, and said transaction dimension queries to a user;

an input module (50) configured to receive a plurality of blockchain dimension responses and a plurality of transaction dimension responses corresponding to said blockchain dimension queries and said transaction dimension queries, related to the new node, from the user; and an assessment module (60) adapted to cooperate with said input module (50) and the database (30) to receive said blockchain dimension queries, said transaction dimension queries, and said blockchain dimension responses, and said transaction dimension responses respectively, said assessment module (60) comprising:

a feature detector (62) configured to detect features from each of said blockchain dimension responses and said transaction dimension responses based on said feature detection rules;

a feature value assignor (64) configured to assign a feature value to each of said detected features based on said feature value assignment rules;

a criticality assignor (66) configured to assign a criticality score to each of said detected features based on said criticality score assignment rules;

a weightage assignor (68) configured to assign a weightage score to each of said blockchain dimension queries and said transaction dimension queries, based on said weightage assignment rules; and a feasibility evaluator (70) configured to receive feature values, criticality scores, and weightage score, and further configured to calculate a feasibility score, thereby evaluating the feasibility of introducing the new node.

2. The system (100) as claimed in claim 1, wherein the system (100) includes a display (80) configured to display the feasibility score of the new node.

3. The system (100) as claimed in claim 1, wherein the system (100) includes a feedback module (90) configured to receive the feasibility score and use it as a feedback.

4. The system (100) as claimed in claim 1, wherein each of the blockchain dimension queries and each of the transaction dimension queries include respective blockchain dimension sub queries and transaction dimension sub queries.

5. The system (100) as claimed in claim 4, wherein the assessment module (60) includes a response combiner (55) configured to combine responses of said blockchain dimension sub queries and transaction dimension sub queries respectively.

6. A method (200) for evaluating the feasibility of introducing a new node in a blockchain infrastructure, said method (200) comprising the following steps:

a. storing, in a memory (10), a set of predetermined rules including feature detection rules, feature value assignment rules, weightage assignment rules, and criticality score assignment rules;

b. receiving the set of predetermined rules and generating system processing commands, by a processor (20);

c. storing, in a database (30), a plurality of blockchain dimension queries, and a plurality of transaction dimension queries;

d. presenting, by a query presentation module (40), said blockchain dimension queries, and said transaction dimension queries to a user;

e. receiving, by an input module (50), a plurality of blockchain dimension responses and a plurality of transaction dimension responses corresponding to said blockchain dimension queries and said transaction dimension queries, related to the new node, from the user;
f. receiving, by an assessment module (60), said blockchain dimension queries, said transaction dimension queries, and said blockchain dimension responses, and said transaction dimension responses respectively;
g. detecting, by a feature detector (62), features from each of said blockchain dimension responses and said transaction dimension responses based on said feature detection rules;
h. assigning, by a feature value assignor (64), a feature value to each of said detected features based on said feature value assignment rules;
i. assigning, by a criticality assignor (66), a criticality score to each of said detect features based on said criticality score assignment rules;
j. assigning, by a weightage assignor (68), a weightage score to each of said blockchain dimension queries and said transaction dimension queries, based on said weightage assignment rules; and
k. receiving, by a feasibility evaluator (70), the feature values, criticality scores, and weightage score, and calculating a feasibility score, thereby evaluating the feasibility of introducing the new node.

7. The method as claimed in claim 6, wherein each of the blockchain dimension queries and each of the transaction dimension queries include respective blockchain dimension sub queries and transaction dimension sub queries.

8. The method as claimed in claim 7, further includes a step of combining responses of said blockchain dimension sub queries and transaction dimension sub queries respectively, by a response combiner (55).

* * * * *